(12) United States Patent
Matsumoto

(10) Patent No.: US 10,686,395 B2
(45) Date of Patent: Jun. 16, 2020

(54) BRUSHLESS MOTOR CONTROL DEVICE

(71) Applicant: DENSO CORPORATION, Kariya, Aichi-pref. (JP)

(72) Inventor: Masakazu Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/376,179

(22) Filed: Apr. 5, 2019

(65) Prior Publication Data

US 2019/0326841 A1 Oct. 24, 2019

(30) Foreign Application Priority Data

Apr. 19, 2018 (JP) .................................. 2018-080933

(51) Int. Cl.
| | |
|---|---|
| *H02P 23/14* | (2006.01) |
| *F04D 13/06* | (2006.01) |
| *H02P 25/03* | (2016.01) |
| *F04D 1/00* | (2006.01) |

(52) U.S. Cl.
CPC .......... *H02P 23/14* (2013.01); *F04D 13/0606* (2013.01); *H02P 25/03* (2016.02); *F04D 1/00* (2013.01)

(58) Field of Classification Search
CPC .......... H02P 25/083; H02P 6/182; H02P 1/00; H02P 1/04; H02P 1/46; H02P 3/00; H02P 3/12; H02P 3/18; H02P 7/00; H02P 6/00; H02P 6/04; H02P 6/12; H02P 6/14; H02P 23/00; H02P 25/00; H02P 27/00; H02P 27/04; H02P 27/06; G05B 2219/37317; G05B 2219/37318; H03K 5/1536

USPC ............ 318/400.01, 400.02, 400.14, 400.15, 318/400.32, 400.34, 400.37, 400.38, 700, (Continued)

(56) References Cited

U.S. PATENT DOCUMENTS

| | | | |
|---|---|---|---|
| 6,504,328 B1 * | 1/2003 | Gontowski, Jr. | ....... H02P 6/182 318/400.25 |
| 8,018,189 B2 * | 9/2011 | Narumi | ..................... H02P 6/18 318/257 |

(Continued)

FOREIGN PATENT DOCUMENTS

| | | |
|---|---|---|
| JP | 2006-254648 A | 9/2006 |
| JP | 2007-189862 A | 7/2007 |
| JP | 2014-023257 A | 2/2014 |

(Continued)

*Primary Examiner* — Antony M Paul
(74) *Attorney, Agent, or Firm* — Oliff PLC

(57) ABSTRACT

In a brushless motor control device, a microcontroller determines a current-on phase of a motor based on zero crossing detected by a position detection circuit, and the inverter circuit generates a voltage for current-on to the determined current-on phase. In a case in which zero crossing has been successively detected plural times, in a phase that was switched from the current-on phase to a current-off phase, in a PWM control cycle after a predetermined masking period, the microcontroller controls to interrupt current to coils of all phases of the motor body. In a state in which current-on has been interrupted, the microcontroller determines the current-on phase based on zero crossing detected in one of the three phases, the inverter circuit generates the voltage for current-on for the determined current-on phase and restarts current-on to the coils.

5 Claims, 7 Drawing Sheets

(58) Field of Classification Search
USPC .. 318/701, 721, 779, 800, 801, 430, 400.35, 318/727
See application file for complete search history.

(56) References Cited

U.S. PATENT DOCUMENTS

| | | | |
|---|---|---|---|
| 9,391,551 B2 * | 7/2016 | Boscolo Berto | ........ H02P 6/182 |
| 2007/0282461 A1 * | 12/2007 | Harwood | ................ H02P 6/182 700/14 |

FOREIGN PATENT DOCUMENTS

| | | |
|---|---|---|
| JP | 6127895 B2 | 5/2017 |
| JP | 2017-229113 A | 12/2017 |

* cited by examiner

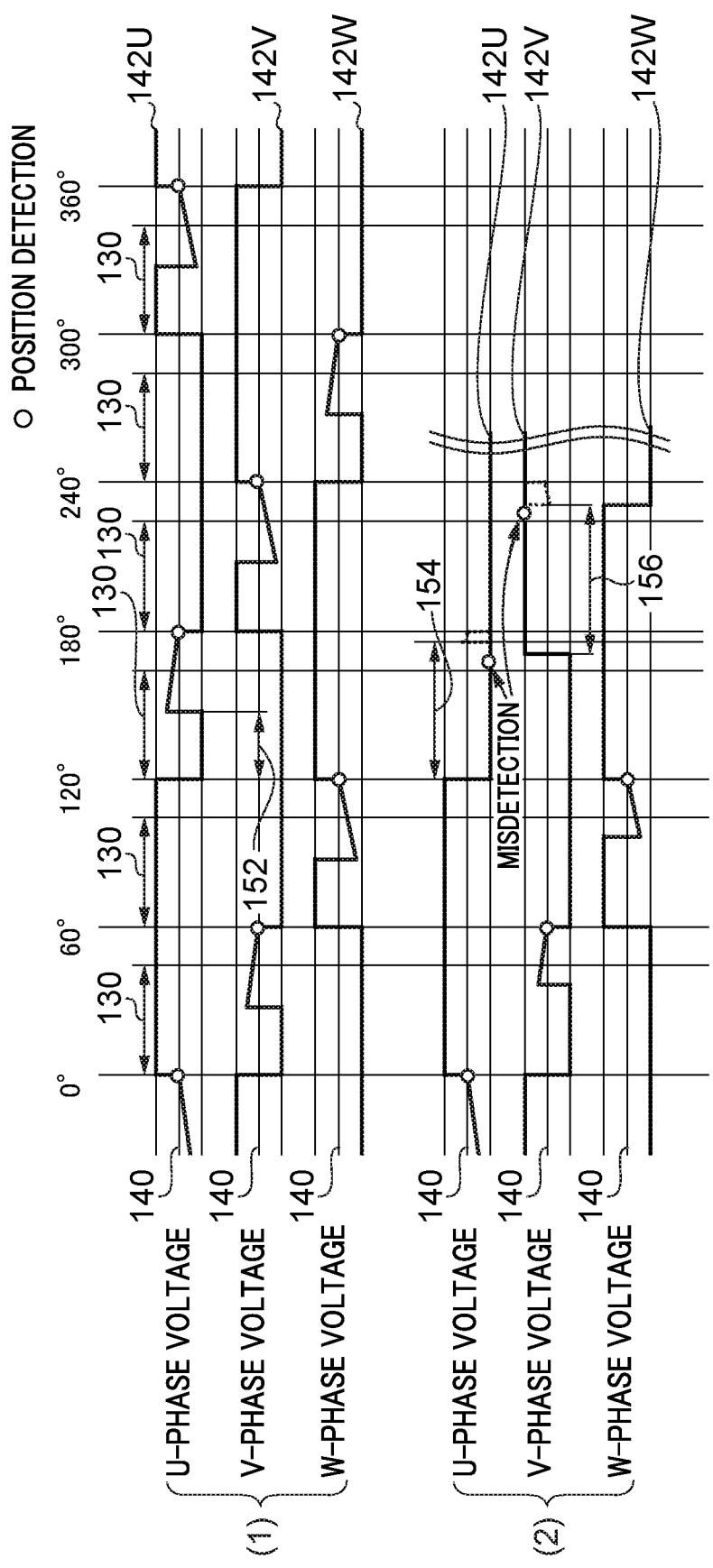

BRUSHLESS MOTOR CONTROL DEVICE

CROSS-REFERENCE TO RELATED APPLICATION

This application claims priority under 35 USC 119 from Japanese Patent Application No. 2018-080933, filed on Apr. 19, 2018, the disclosure of which is incorporated by reference herein.

BACKGROUND

Technical Field

The present disclosure relates to a brushless motor control device for driving a vehicle water pump or the like.

Related Art

In a water cooled engine, an engine is cooled by circulating cooling water including antifreeze liquid in a water jacket. The water jacket is provided to an engine block or the like and configures a flow path for the cooling water. A water pump is attached to the engine block of a water cooled engine to circulate the cooling water, and the water pump is driven by a pump drive motor having a power supply controlled by an electronic control unit (ECU) provided in a vehicle.

The flow rate of the cooling water needs to be appropriate in order to cool the engine effectively. In recent years brushless motors (hereafter "motors") with precise rotation speed control capabilities are being employed as pump drive motors.

Motors are rotated by a voltage that changes according to the position of magnetic poles of a rotating rotor. Generally the magnetic poles of a rotor, or the magnetic poles of sensor magnets that rotate with the rotor, are detected by sensors such as Hall sensors, and the rotation position of the rotor magnetic poles are estimated therefrom. However, Hall sensors are semiconductor elements and so are intolerant of heat. A water pump is installed inside the engine compartment of a vehicle. Accordingly, the semiconductors configuring the Hall sensors may be damaged in the high temperature environment inside the engine compartment. Therefore, detection of the rotor rotation position of a pump drive motor is estimated based on an induction voltage generated by coils of a current-off phase of the motor as the rotor is rotating.

FIG. 7 is an explanatory diagram of a case in which rotor rotation position detection is performed using induction voltages 142U, 142V, 142W expressed as time series of positive and negative fluctuations with respect to a reference voltage 140. (1) of FIG. 7 is an example of a case in which rotation position detection has succeeded, and (2) of FIG. 7 is an example of a case in which rotation position detection has failed.

Position detection using the induction voltages 142U, 142V, 142W is performed by detecting zero crossings where the induction voltages 142U, 142V, 142W match the reference voltage 140. A neutral point voltage of the coils of the motor or the like is, for example, employed as the reference voltage.

In practice, the reference voltage and the induction voltages 142U, 142V, 142W are input to a circuit such as a comparator circuit. Fluctuations in the induction voltages 142U, 142V, 142W with respect to the reference voltage are output as square waves, and edge portions of the square waves are detected as zero crossings. Zero crossings are generated according to a switchover timing of the magnetic poles of the rotor. The brushless motor control device accordingly estimates the rotation position of the magnetic poles of the rotor based on the zero crossings detected.

As described above, zero crossing detection is performed using a current-off phase. However, immediately after interrupting current-on to a coil of the motor, there are cases in which unexpected fluctuation in voltage called "return current" occurs due to counter-electromotive force. Thus, as illustrated in (1) of FIG. 7, zero crossing detection in the current-off phase is performed at a timing after a return current masking period 130 has elapsed since current-on interruption, in order to avoid a return current period 152 in a case in which a return current is generated after current-on interruption. In (1) of FIG. 7, zero crossing is detected avoiding the return current, by making the return current masking period 130 longer than the return current period 152.

However, in a case in which a motor is rotating at high speed, as illustrated in (2) of FIG. 7, return current periods 154, 156 become longer than the return current masking period 130 due to being affected by the increased rotation speed, increased current flow flowing in the coils (referred to below as "motor current"), and the like. This results in misdetection of zero crossing.

Japanese Patent Application Laid-Open (JP-A) No. 2014-23257 discloses a sensor-less brushless motor drive device in which a warning is issued in a case in which an abnormality has been detected in rotation position detection due to a return current, and an inverter in a drive circuit driving the motor is reset and re-actuated.

However, due to the inverter being re-actuated in the invention described in JP-A No. 2014-23257, there is a time lag before restarting rotation position detection for the rotor of the motor. Accordingly, there is a case in which rotation control is not being performed to the motor for a long period.

SUMMARY

The present disclosure is to provide a brushless motor control device that may promptly normalizes rotation control of the motor in a case in which an abnormality in detection of rotation position of the rotor has been detected.

A first aspect of the present disclosure is a brushless motor control device including: a drive circuit configured to generate a voltage to be applied to a coil of a current-on phase of a three phase motor; a zero crossing detection section configured to compare an induction voltage generated in the coil of a current-off phase of the three phase motor with a reference voltage, and to detect zero crossing of the induction voltage; and a control section configured to control the drive circuit to determine the current-on phase based on the detected zero crossing and to perform phase switching to current-on, for the coil of the determined current-on phase, wherein, in a case in which zero crossing has been successively detected, in the coil that was switched from the current-on phase to the current-off phase, in a predetermined period including a time when a masking period has elapsed from switching, the control section determines the current-on phase based on the detected zero crossing, in a state in which current to the coils of all phases has been interrupted, and controls the drive circuit to set the coil of the determined current-on phase to current-on.

According to the brushless motor control device of the first aspect, in a case in which zero crossing has been successively detected in the predetermined period including the time when the masking period has elapsed, this detection is taken as an abnormality in detection of rotation position of the rotor, and the current-on phase is determined based on a zero crossing detected in a state in which current-on has been interrupted. Accordingly, the first aspect of the present disclosure may promptly normalize the rotation control of the motor.

In a second aspect of the present disclosure, in the above-described first aspect, in the predetermined period, the zero crossing detection section may detect for zero crossing immediately before the masking period from the phase switching elapses, and may detect for zero crossing immediately after the masking period from the phase switching has elapsed.

According to the brushless motor control device of the second aspect, in a case in which the zero crossings are successively detected around the elapse of the predetermined masking period at which the effect of return current would be expected to have been eliminated, this detection is taken as abnormal detection of rotor rotation position. Accordingly, the first aspect of the present disclosure may promptly detect the step out in the motor, and may promptly normalize the rotation control of the motor.

In a third aspect of the present disclosure, in the above-described first aspect, in the predetermined period, the zero crossing detection section may detect for zero crossing plural successive times immediately after the masking period from the phase switching has elapsed.

According to the brushless motor control device of the third aspect, in a case in which zero crossings are detected two times in succession immediately after the elapse of the predetermined masking period at which the effect of return current would be eliminated, this detection is taken as abnormal detection of rotor rotation position. Accordingly, the third aspect of the present disclosure may promptly detect the step out in the motor, and may promptly normalize the rotation control of the motor.

In a fourth aspect of the present disclosure, in the above-described aspects, the control section may determine the current-on phase of the three phase motor based on the first detected zero crossing after current-on interruption.

According to the brushless motor control device of the fourth aspect, by determining the current-on phase of the three phase motor based on first detected zero crossing after current-on interruption, rotation control of the motor may be rapidly normalized.

In a fifth aspect of the present disclosure, in the above-described first to third aspects, the control section may determine the current-on phase of the three phase motor based on the zero crossing detected for two or more predetermined times after current-on interruption.

According to the brushless motor control device of the fifth aspect, by determining the current-on phase based on the zero crossing detected two or more times after current-on interruption, the effect of return current may be completely eliminated, and detection of rotation position of the rotor may become accurate.

BRIEF DESCRIPTION OF THE DRAWINGS

Exemplary embodiments will be described in detail based on the following figures, wherein:

FIG. 7 is an explanatory diagram of cases in which rotation position detection of a rotor is detected using induction voltages expressed as time series of positive and negative fluctuations with respect to a reference voltage.

DETAILED DESCRIPTION

Figure 1:
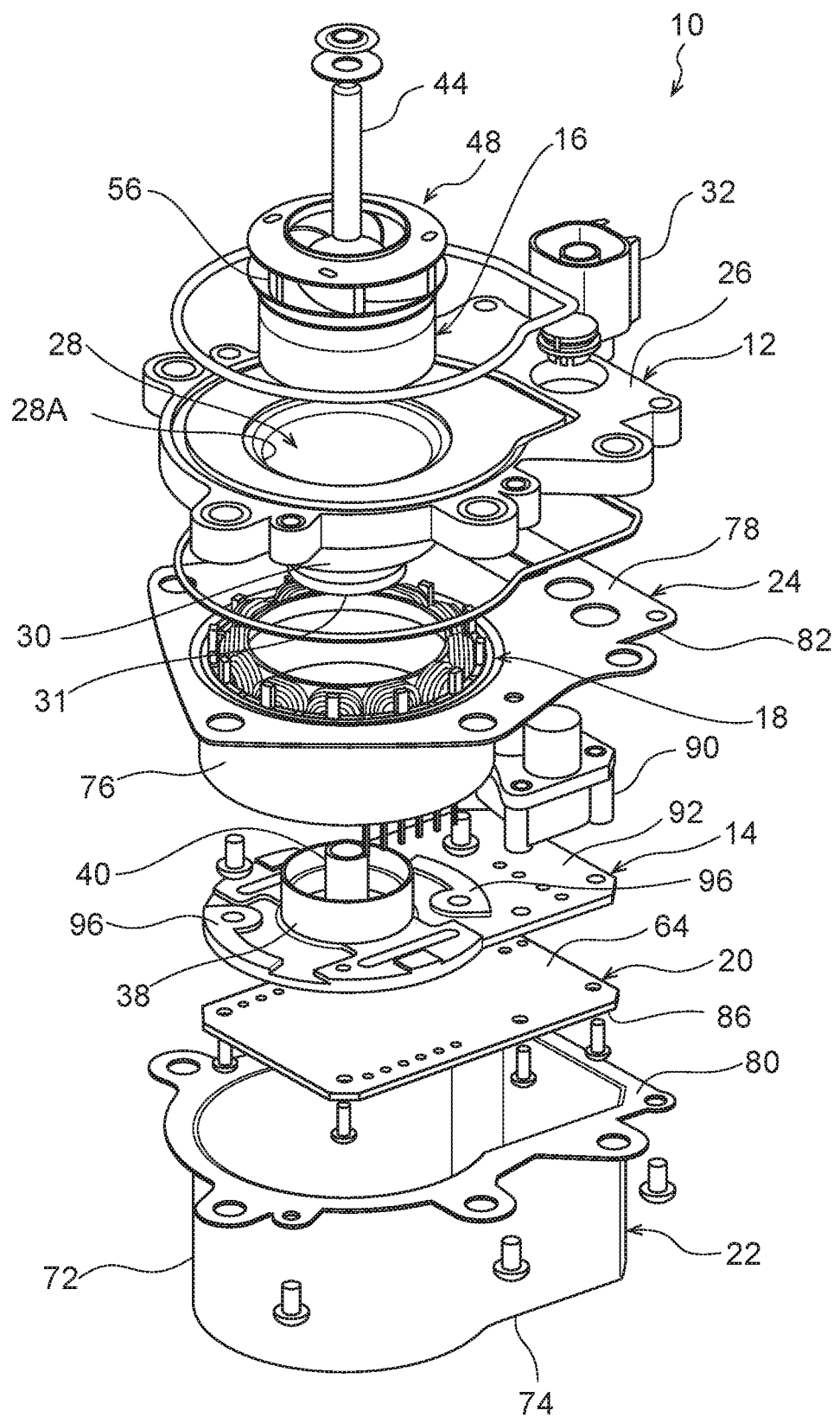
FIG. 1 is an exploded perspective view of a pump drive motor according to an exemplary embodiment of the present disclosure.

FIG. 1 is an exploded perspective view of a pump drive motor 10 (hereafter abbreviated to "motor 10") according to the present exemplary embodiment. As illustrated in FIG. 1, the motor 10 includes a housing 12, a base member 14, a rotor 16, a stator 18, a control board 20, a shield cover 22, and a stator holder 24.

The housing 12 is made from a resin. The housing 12 includes a single body configured by a plate shaped housing body 26, and by a peripheral wall 30 of a rotor housing chamber 28 that houses the rotor 16 and includes an opening 28A. A connector 32 is provided at one end of the housing body 26, and the peripheral wall 30 of the rotor housing chamber 28 is formed in a cylindrical shape at positions further toward the other end of the housing body 26 than a central portion thereof.

The motor 10 is, for example, suitably applied to a water pump that circulates engine cooling water. The rotor housing chamber 28 is in communication with a pump chamber formed in an engine block of an automobile or the like when the housing 12 has been attached to the engine block.

The base member 14 is, for example, made from an electrically conductive metal having high heat transfer characteristics, such as an aluminum alloy, for example. A bottom wall 31 is formed to the rotor housing chamber 28, and a join portion 38 and a shaft support portion 40 are formed to the base member 14 where the bottom wall 31 is disposed. The join portion 38 and the shaft support portion 40 are each formed in a cylindrical shape.

The join portion 38 is formed at the radial direction outside of the shaft support portion 40, and is formed coaxially to a leading end portion of the peripheral wall 30. The join portion 38 projects toward the rotor housing chamber 28 side, and joins with an outer peripheral portion at the leading end portion of the peripheral wall 30. A seal member such as an O-ring or the like is, for example, provided between an inner peripheral portion of the join portion 38 and the outer peripheral portion at the leading end portion of the peripheral wall 30.

The shaft support portion 40 is formed at the radial direction inside of the peripheral wall 30, and projects inside the rotor housing chamber 28. One end of a shaft 44 extending along the axial direction of the rotor housing chamber 28 is press fitted inside the shaft support portion 40. The shaft 44 is thereby supported by the shaft support portion 40.

The rotor 16 is rotatably housed in the rotor housing chamber 28. The rotor 16 is rotatably supported by the shaft 44 through an axial bearing. The rotor 16 is configured by permanent magnets, and an impeller member 48 is provided at an axial direction of the shaft 44 side.

An impeller 56 is formed to the impeller member 48. The impeller 56 is housed in the pump chamber of the engine block. A liquid flows into the pump chamber and the liquid is discharged from the pump chamber by the impeller 56 rotating inside the pump chamber. Note that due to the rotor housing chamber 28 being in communication with the pump chamber, the rotor housing chamber 28 is filled by the liquid in a case in which the liquid flows into the pump chamber.

The stator 18 is provided around the periphery of the peripheral wall 30, and faces the rotor 16 in the radial direction, with the peripheral wall 30 interposed therebetween. The stator 18 includes coils wound on a ring shaped stator core. What is referred to as a rotating magnetic field is generated at the stator 18 by controlling the polarity of voltages applied to the coils of the stator 18. The rotor 16 rotates so as to follow the rotating magnetic field by the permanent magnets configuring the rotor 16 being attracted or repelled by the rotating magnetic field generated by the stator 18.

The control board 20 includes plural elements mounted on a board body 64, such as a printed circuit board or the like. The board body 64 is superimposed on the bottom wall 31 from the opposite side to the rotor housing chamber 28. Note that the board body 64 may be superimposed on the bottom wall 31 with an interposer, such as heat transfer sheet or a heat transfer gel, interposed between the board body 64 and the bottom wall 31.

The shield cover 22 is formed from a ferromagnetic body such as iron or the like. The shield cover 22 includes a surround portion 72 that surrounds the control board 20 and the base member 14 described above and also surrounds a retaining portion 76 of the stator holder 24 described later. The shield cover 22 also includes a covering portion 74 that covers the control board 20 from the opposite side of the control board 20 to the bottom wall 31. The shield cover 22 forms a portion of the external shape of the motor 10.

The stator holder 24 is formed by a ferromagnetic body such as iron or the like. The stator holder 24 includes the cylindrical shaped retaining portion 76. The retaining portion 76 is provided between the stator 18 and the surround portion 72. The stator 18 is supported by the retaining portion 76 due to the stator core wound with the coils being press fitted against the inner periphery of the retaining portion 76.

An extension flange 78 is formed extending from an end portion on the housing body 26 side of the retaining portion 76 and extending along the plate shaped housing body 26 toward the surround portion 72. Moreover, a first flange 80 is also formed at a peripheral edge portion of the shield cover 22 described above, and a second flange 82 is formed to a peripheral edge portion of the stator holder 24. The first flange 80 and the second flange 82 are joined together by fasteners or the like. Note that the first flange 80 and the second flange 82 are examples of connection portions connecting the shield cover 22 and the stator holder 24 together.

The control board 20 described above is housed in a space formed in a case in which the stator holder 24 and the shield cover 22 have been fixed together.

An extension portion 86 is formed to the board body 64 of the control board 20 so as to extend toward the same side as the extension flange 78 described above. An electrical component 90 larger than the elements mounted on the board body 64 is disposed alongside the retaining portion 76, in a space formed between the extension flange 78 and the extension portion 86. The electrical component 90 is, for example, a noise suppression device mounted to a face of the board body 64 on the bottom wall side. A support portion 92 is formed to the base member 14 so as to extend from the bottom wall 31 toward the same side as the extension portion 86. The extension portion 86 is superimposed on the support portion 92.

Figure 2:
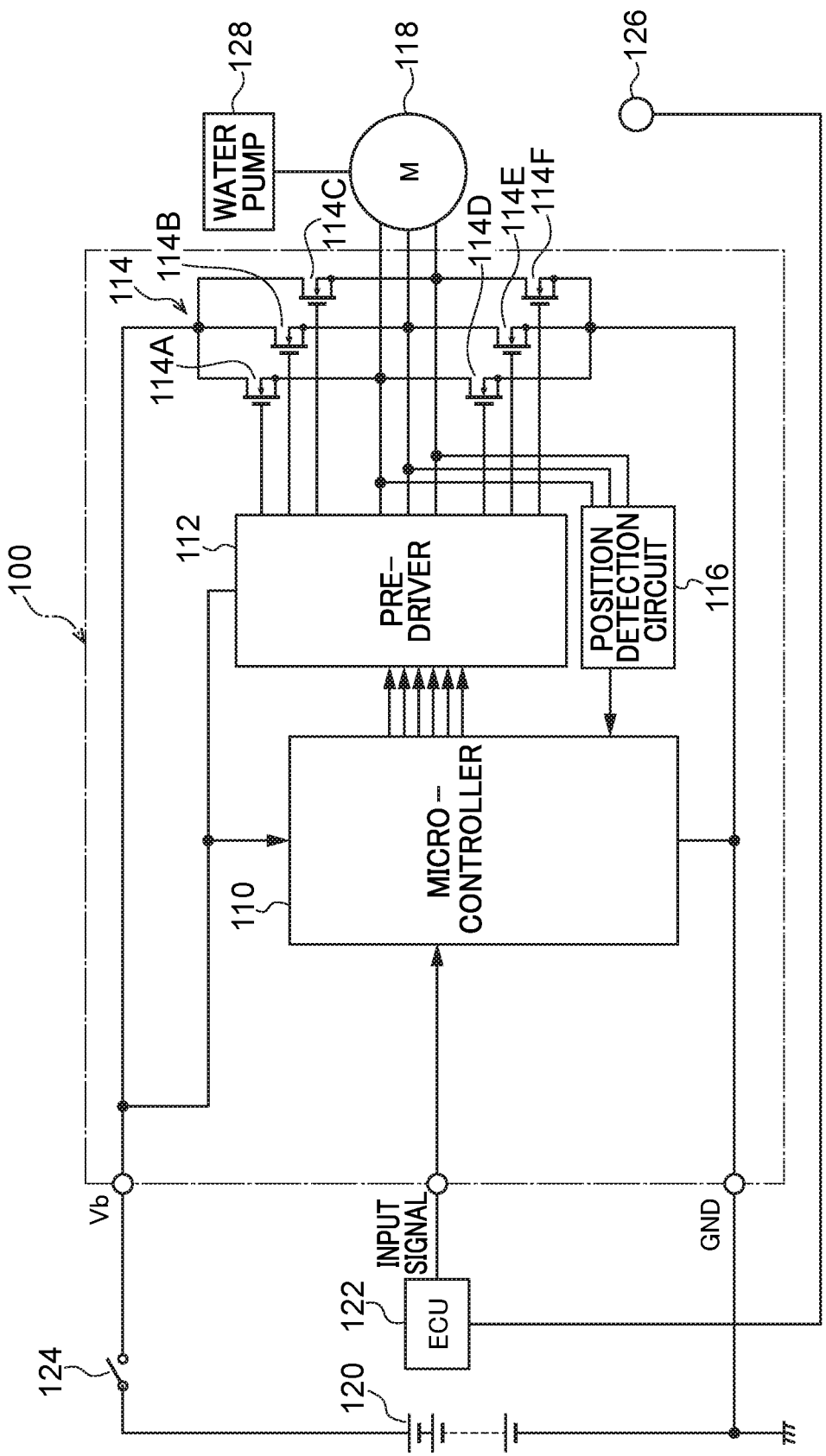
FIG. 2 is a schematic diagram illustrating a brushless motor control device according to an exemplary embodiment of the present disclosure.

FIG. 2 is a schematic diagram illustrating an example of a brushless motor control device 100 according to the present exemplary embodiment. In a case in which an ignition switch 124 is switched ON, an inverter circuit 114 switches power supplied from an onboard battery 120 and generates a voltage for application to the coils of the stator 18 on a motor body 118. For example, switching is performed so that inverter FETs 114A, 144D generate a voltage applied to U-phase coils, inverter FETs 114B, 144E generate a voltage applied to V-phase coils, and inverter FETs 114A, 144D generate a voltage applied to W-phase coils.

The respective drains of the inverter FETs 114A, 114B, 114C are connected to the positive electrode of the onboard battery 120. The respective sources of the inverter FETs 114D, 114E, 114F are connected to the negative electrodes of the battery 120.

In the present exemplary embodiment, the rotation speed and the position (rotation position) of the rotor 16 is detected by induction voltage generated by rotation of the rotor 16 of the motor body 118. In a brushless motor, generally, a magnetic field of rotor magnets or of sensor magnets provided coaxially to the shaft 44 is detected by Hall sensors. The rotation speed and the position (rotation position) of the rotor 16 are then detected based on the detected magnetic field. However, the motor body 118 according to the present exemplary embodiment is employed in an engine water pump 128. In addition to operating in a high temperature environment, the rotor housing chamber 28 housing the rotor 16 is structure for circulating the engine cooling water. Accordingly, it is difficult to place the Hall sensors in the vicinity of the rotor. Thus, in the motor 10 according to the present exemplary embodiment, the rotation speed and the position of the rotor 16 is detected using induction voltages generated by current-off phase coils, and Hall sensors are not employed.

The induction voltage is an analogue signal having a sinusoidal waveform that changes according to rotation of the rotor 16. However, in the present exemplary embodiment, the sinusoidal shaped analogue signal is converted into a square pulse signal by a position detection circuit 116 including a converter, and then is input to a microcontroller 110.

The microcontroller 110 computes a position of the rotor 16 from the signal input from the position detection circuit 116. Then, based on the computed position of the rotor 16 and a signal input from an ECU 122, which is a higher level controller, the microcontroller 110 computes a duty ratio for pulse width modulation (PWM) by controlling switching of the inverter circuit 114. A water temperature sensor 126 for detecting the temperature of the engine cooling water is connected to the ECU 122. The rotation speed of the motor body 118 is controlled to increase the discharge rate of cooling water from the water pump 128 as the temperature of the cooling water rises. The water temperature sensor 126 is provided to a section of the flow path of the cooling water, such as a water jacket of the engine, a radiator, or the like.

The duty ratio signal computed by the microcontroller 110 is output to the inverter circuit 114 via a pre-driver 112, and the inverter circuit 114 generates a voltage according to the duty ratio and applies the generated voltage to the coils of the motor body 118.

Figure 3:
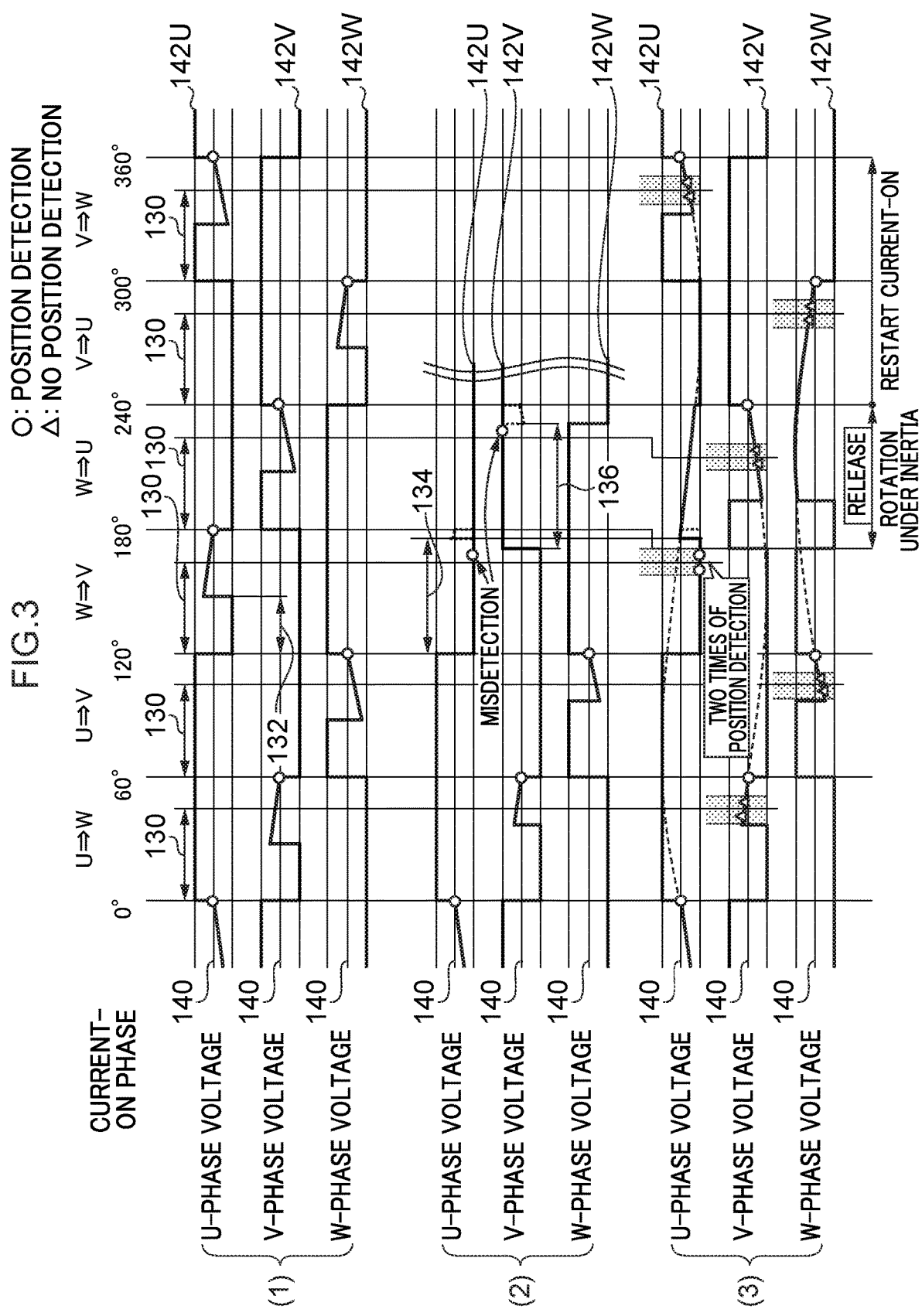
FIG. 3 is an explanatory diagram to illustrate cases in which rotation position detection of a rotor is performed using induction voltages expressed as time series of positive and negative fluctuations with respect to a reference voltage 140.

FIG. 3 is an explanatory diagram to illustrate cases in which rotation position detection of a rotor is performed using the induction voltages 142U, 142V, 142W expressed as time series of positive and negative fluctuations with respect to the reference voltage 140. (1) of FIG. 3 is an example of a case in which rotation position detection has succeeded. (2) of FIG. 3 is an example of a case in which rotation position detection has failed. (3) of FIG. 3 is an example of a case in which current-on is interrupted to all phases, in a case in which rotation position detection has failed in the brushless motor control device 100, and rotation position detection is performed while the rotor is allowed to rotated under inertia.

In (1) of FIG. 3, zero crossing is detected by avoiding the effect of the return current by setting the return current masking period 130 longer than a return current period 132. However, in (2) of FIG. 3, since return current periods 134, 136 are longer than the return current masking period 130, zero crossing is misdetected. In a case in which there is misdetection in zero crossing, the voltages to be applied to the coils of the motor 10 cannot be generated to match the rotation position of the magnetic poles of the rotor, and as a result, step out might occur in the motor 10.

(3) of FIG. 3 differs from the cases of (1) and (2) in the point that current-on is interrupted to coils of all phases, in a case in which zero crossing has been detected either immediately before the end, or immediately after the end of the return current masking period 130. In (3) of FIG. 3, since the zero crossing is detected twice in succession in the U-phase, the microcontroller 110 temporarily stops the current-on state to the coils of all phases to let the rotor rotate under inertia and to eliminates the effect of return current. Thereafter, in a case in which zero crossing is detected (zero crossing is detected in the V-phase in FIG. 3C), the current-on phase is determined based on this detected zero crossing and current-on is restarted.

In the present exemplary embodiment, current-on is restarted in a case in which zero crossing has been detected in one of the phases after current-on interruption to all phases. Accordingly, the period when the motor 10 rotates under inertia may be minimized. The present exemplary embodiment may also enable the rotation control of the motor 10 to be promptly normalized by determining the current-on phase based on the first detected zero crossing after current-on interruption to all phases, and then restarting current-on. However, in order to detect zero crossing after elimination of the effect of return current, the current-on phase may be determined based on the zero crossing detected for two or more predetermined times, after current-on interruption to all phases.

In the present exemplary embodiment, the time separation for detecting two successive zero crossings is the control cycle of PWM of the microcontroller 110. However, successive zero crossings may be detected in a cycle of a particular integer number of times the control cycle.

Moreover, in the present exemplary embodiment, although in principle current-on is interrupted to coils of all phases in a case in which zero crossing has been detected either immediately before the end, or immediately after the end of the return current masking period 130, current-on may be interrupted to coils of all phases in the three phase motor, in a case in which zero crossing has been detected twice in succession, immediately after the return current masking period 130 has elapsed.

Figure 4:
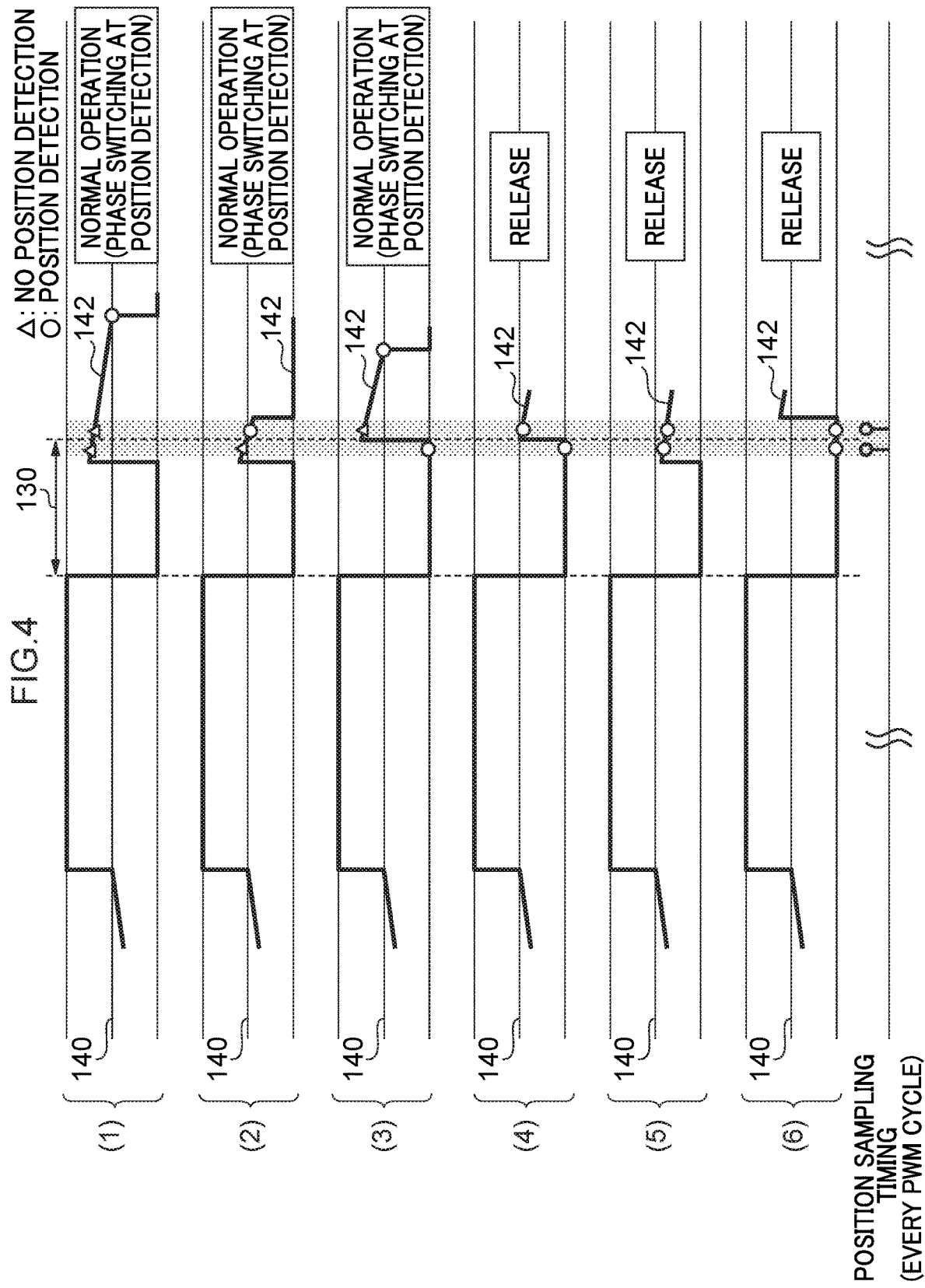
FIG. 4 is an explanatory diagram illustrating various states of zero crossing detection around the end of a return current masking period in a brushless motor control device according to an exemplary embodiment of the present disclosure.

FIG. 4 is an explanatory diagram illustrating various states of zero crossing detection around the end of the return current masking period 130 in the brushless motor control device 100 according to the present exemplary embodiment. In (1) of FIG. 4, zero crossing is not detected around the end of the return current masking period 130, but zero crossing is detected after the elapse of the return current masking period 130. In (2) of FIG. 4, zero crossing is detected immediately after the end of the return current masking period 130. In (3) of FIG. 4, zero crossing is detected immediately before the end of the return current masking period 130, however, zero crossing is also detected after the return current masking period 130 has elapsed.

The states illustrated in (1), (2) and (3) in FIG. 4 each illustrate normal operation, and switching of current-on phases is performed based on the detected zero crossing.

Plural zero crossing is detected in each of (4) to (6) of FIG. 4 (for convenience two times) around the end of the return current masking period 130. As stated above, since the induction voltage 142 changes in a sinusoidal waveform, the voltage value does not match the fixed reference voltage 140 plural times successively within a short period. Accordingly, in the present exemplary embodiment, the states illustrated in (4), (5) and (6) in FIG. 4 are taken as states in which effect from return current after the end of the return current masking period 130 has occurred. Then, the current-on to the coils of all phases is temporarily interrupted, and the rotor rotates under inertia to eliminate the effect from return current. Thereafter, rotor position detection is performed and current-on is restarted. Note that, the return current masking period 130 is set depending on the specification of the motor 10, and, for example, is determined by experimentation or the like using actual devices.

Figure 5:
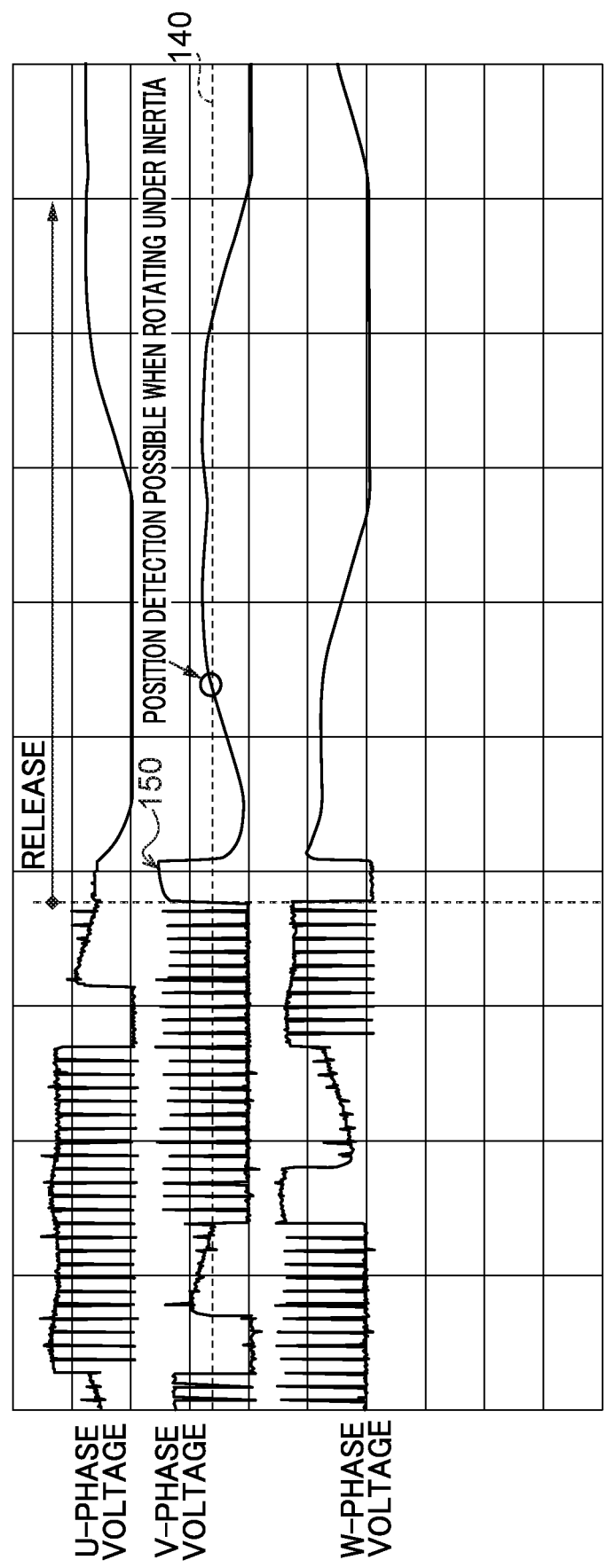
FIG. 5 is schematic diagram illustrating how the voltage changes for each phase of a motor according to an exemplary embodiment of the present disclosure.

FIG. 5 is a schematic diagram illustrating an example of how the voltage changes in each phase of the motor 10 according to the present exemplary embodiment. As illustrated in FIG. 5, the V-phase voltage shows a divergent change from the reference voltage 140 due to a return current 150 generated unexpectedly after the end of current-on. In this case, in the present exemplary embodiment, current-on to the coils of all phases is temporarily interrupted, the rotor is allowed to rotate under inertia (released), and then zero crossing is detected.

Figure 6:
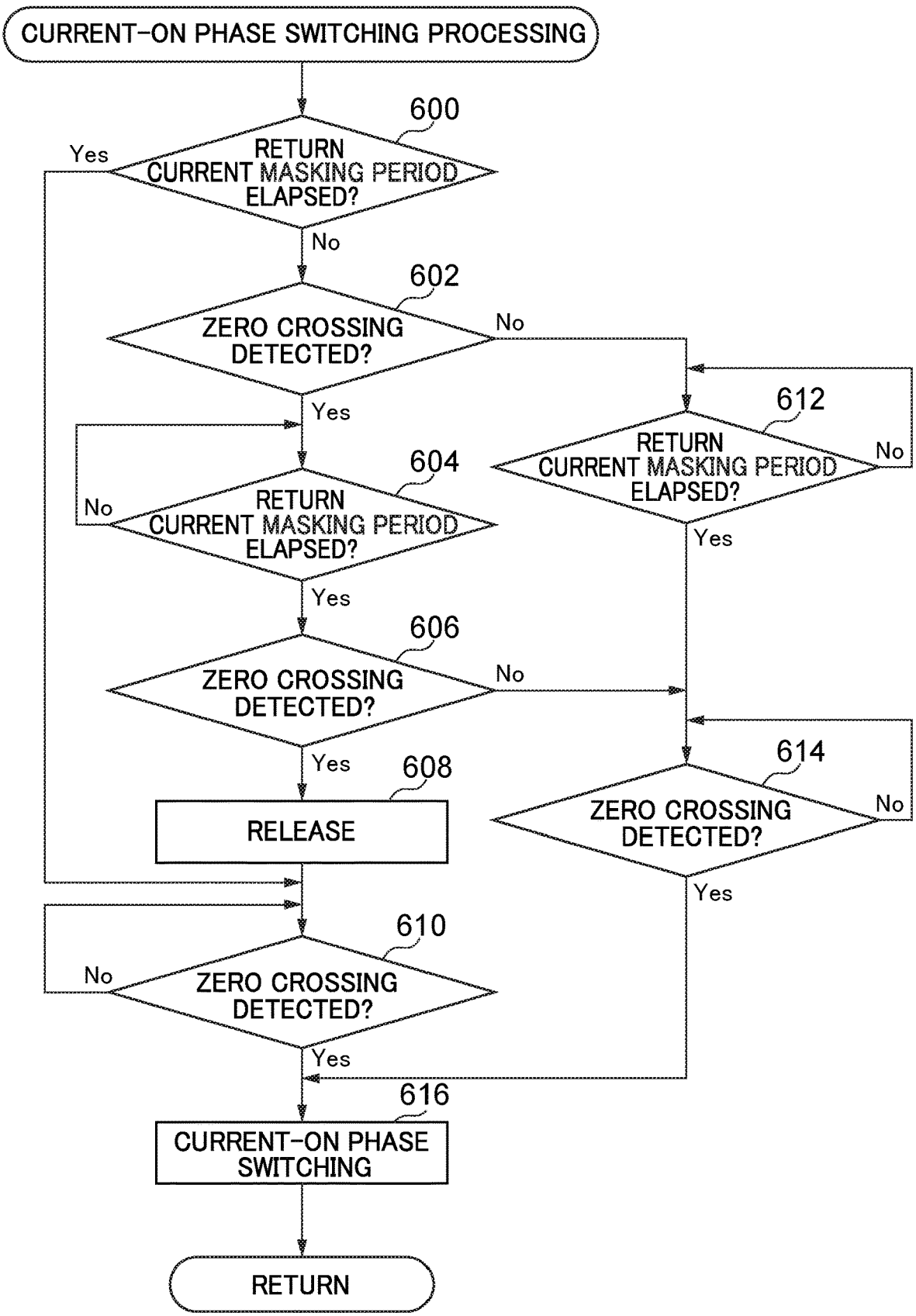
FIG. 6 is a flowchart illustrating processing for current-on phase switching in a brushless motor control device according to an exemplary embodiment of the present disclosure.

FIG. 6 is a flowchart illustrating an example of processing for current-on phase switching in the brushless motor control device 100 according to the present exemplary embodiment. At step 600, determination is made as to whether or not the return current masking period 130 has elapsed. The step proceeds to step 610 in a case in which the return current masking period 130 has elapsed, and the step proceeds to step 602 in a case in which the return current masking period 130 has not elapsed.

At step 602, determination is made as to whether or not zero crossing has been detected. The step proceeds to step 604 in a case in which zero crossing has been detected at step 602 (states illustrated in (3) to (6) of FIG. 4), and the step proceeds to step 612 in a case in which zero crossing has not been detected (states illustrated in (1) and (2) of FIG. 4).

At step 604 determination is made as to whether or not the return current masking period 130 has elapsed. The step proceeds to step 606 in a case in which the return current masking period 130 has elapsed, and in a case in which the return current masking period 130 has not elapsed processing is put on standby until the return current masking period 130 does elapse.

At step 606 determination is made as to whether or not the zero crossing has been detected immediately after the return current masking period 130 elapsed. The step proceeds to step 608 in a case in which zero crossing has been detected at step 606 (states illustrated in (4) to (6) in FIG. 4), and the step proceeds to step 614 in a case in which zero crossing has not been detected at step 606 (state illustrated in (3) in FIG. 4).

At step 608, current-on to the coils of all phases is temporarily interrupted, and the rotor is released and allowed to rotate under inertia. Then determination is made at step 610 as to whether or not zero crossing has been detected for any phase. In a case in which zero crossing has been detected for one of the phases (states illustrated in (4) to (6) in FIG. 4), current-on phase switching is performed at step 616 (and at the same time, current-on to the motor 10 is restarted) and processing then returns. However, in a case in which zero crossing has not been detected at step 610, standby is maintained until zero crossing is detected.

In a case in which zero crossing has not been detected at step 602, determination is made at step 612 as to whether or not the return current masking period 130 has elapsed. The step proceeds to step 614 in a case in which the return current masking period 130 has elapsed, and in a case in which the return current masking period 130 has not elapsed, processing is put on standby until the return current masking period 130 does elapse.

In a case in which zero crossing has not been detected at step 606, and in a case in which the return current masking period 130 has elapsed at step 612, determination is made as to whether or not zero crossing has been detected at step 614. In a case in which zero crossing has been detected, current-on phase switching is performed at step 616 and processing then returns. In a case in which zero crossing has not been detected at step 614, standby is maintained until zero crossing is detected.

As explained above, in the present exemplary embodiment, determination as to whether or not zero crossing has been misdetected due to return current is made using zero crossing detection around the end of the return current masking period 130. The zero crossing detection is whether or not one of the induction voltages 142U, 142V, 142W matches the reference voltage 140, can be easily detected by using a circuit such as a comparator normally provided to the brushless motor control device 100. This may enables zero crossing misdetection to be determined without modifying the existing configuration of the brushless motor control device 100 and without adding new configuration thereto.

Moreover, in the present exemplary embodiment, in a case in which misdetection of zero crossing has occurred after temporarily interrupting current-on to the coils of all phases and eliminating the effect of return current, the rotation position of the rotor is detected and current-on is restarted. Accordingly, since sufficient time for eliminating the effect of return current is, for example, millisecond order, the brushless motor control device of the present disclosure may promptly normalize the rotation control of a motor in a case in which an abnormality in rotor rotation position detection has been detected.

What is claimed is:

1. A brushless motor control device comprising:
 a drive circuit configured to generate a voltage to be applied to a coil of a current-on phase of a three phase motor;
 a zero crossing detection section configured to compare an induction voltage generated in the coil of a current-off phase of the three phase motor with a reference voltage, and to detect zero crossing of the induction voltage; and
 a control section configured to control the drive circuit to determine the current-on phase based on the detected zero crossing and to perform phase switching to current-on, for the coil of the determined current-on phase,
 wherein, in a case in which zero crossing has been successively detected, in the coil that was switched from the current-on phase to the current-off phase, in a predetermined period including a time when a masking period has elapsed from switching, the control section determines the current-on phase based on the detected zero crossing, in a state in which current to the coils of all phases has been interrupted, and controls the drive circuit to set the coil of the determined current-on phase to current-on.

2. The brushless motor control device of claim 1, wherein, in the predetermined period, the zero crossing detection section detects for zero crossing immediately before the masking period from the phase switching elapses, and detects for zero crossing immediately after the masking period from the phase switching has elapsed.

3. The brushless motor control device of claim 1, wherein, in the predetermined period, the zero crossing detection section detects for zero crossing a plurality of successive times immediately after the masking period from the phase switching has elapsed.

4. The brushless motor control device of claim 1, wherein the control section determines the current-on phase of the three phase motor based on the first detected zero crossing after current-on interruption.

5. The brushless motor control device of claim 1, wherein the control section determines the current-on phase of the three phase motor based on the zero crossing detected for two or more predetermined times after current-on interruption.

* * * * *